US012275838B2

(12) United States Patent
Ota et al.

(10) Patent No.: US 12,275,838 B2
(45) Date of Patent: Apr. 15, 2025

(54) SHEET MOLDING COMPOUND AND FIBER-REINFORCED COMPOSITE MATERIAL

(71) Applicant: Mitsubishi Chemical Corporation, Tokyo (JP)

(72) Inventors: Akira Ota, Tokyo (JP); Masahiro Ichino, Tokyo (JP); Takuya Teranishi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/938,881

(22) Filed: Oct. 7, 2022

(65) Prior Publication Data

US 2023/0046977 A1   Feb. 16, 2023

Related U.S. Application Data

(63) Continuation of application No. 16/594,122, filed on Oct. 7, 2019, now abandoned, which is a continuation of application No. PCT/JP2018/015027, filed on Apr. 10, 2018.

(30) Foreign Application Priority Data

Apr. 12, 2017   (JP) ................. 2017-079132

(51) Int. Cl.
| C08L 63/00 | (2006.01) |
| C08G 59/28 | (2006.01) |
| C08G 59/50 | (2006.01) |
| C08J 5/24  | (2006.01) |
| C08K 5/1539| (2006.01) |
| C08K 7/06  | (2006.01) |
| C08K 5/315 | (2006.01) |

(52) U.S. Cl.
CPC .............. *C08L 63/00* (2013.01); *C08G 59/28* (2013.01); *C08G 59/5053* (2013.01); *C08J 5/243* (2021.05); *C08J 5/249* (2021.05); *C08K 5/1539* (2013.01); *C08K 7/06* (2013.01); *C08J 2363/00* (2013.01); *C08K 5/3155* (2013.01)

(58) Field of Classification Search
None
See application file for complete search history.

(56) References Cited

U.S. PATENT DOCUMENTS

| 5,084,532 A    | 1/1992  | Schenkel |
| 2015/0065606 A1 | 3/2015 | Matsuda et al. |
| 2016/0369042 A1 | 12/2016 | Nii et al. |
| 2017/0226274 A1* | 8/2017 | Harrington .............. C08L 63/00 |

FOREIGN PATENT DOCUMENTS

| EP | 3 425 005 A1    | 1/2019  |
| JP | 58-191723 A     | 11/1983 |
| JP | 61-078841 A     | 4/1986  |
| JP | 02-088684 A     | 3/1990  |
| JP | 02-088685 A     | 3/1990  |
| JP | 02-286722 A     | 11/1990 |
| JP | 04-088011 A     | 3/1992  |
| JP | 6-166742 A      | 6/1994  |
| JP | 2001-354788 A   | 12/2001 |
| JP | 2002-012649 A   | 1/2002  |
| JP | 2002-145986 A   | 5/2002  |
| JP | 2004-043769 A   | 2/2004  |
| JP | 2004-189811 A   | 7/2004  |
| JP | 2008-038082 A   | 2/2008  |
| JP | 2011-089071 A   | 5/2011  |
| JP | 2012-56980 A    | 3/2012  |
| JP | 4894377 B2      | 3/2012  |
| JP | 2014-185256 A   | 10/2014 |
| WO | WO 98/22527 A1  | 5/1998  |
| WO | WO 2013/115152 A1 | 8/2013 |
| WO | WO 2015/001764 A1 | 1/2015 |
| WO | WO 2017/150521 A1 | 9/2017 |
| WO | WO 2018/190329 A1 | 10/2018 |

OTHER PUBLICATIONS

Japanese Office Action issued Jul. 4, 2023 in Japanese Application 2022-153947, (with unedited computer-generated English translation), 8 pages.
International Search Report issued Jul. 17, 2018 in PCT/JP2018/015027 filed Apr. 10, 2018 (with English Translation).
Office Action issued Jul. 2, 2019 in Japanese Patent Application No. 2018-523820 (with English Translation).
Shimbo, M, "Epoxy Resin Handbook", Nikkan Kogyo Shimbun, Dec. 25, 1987 (Showa 62), 6 pages (with partial English Translation).
Japanese Office Action issued Oct. 23, 2019 in Japanese Patent Application No. 2018-523820 (with unedited computer generated English translation), 6 pages.
Extended European Search Report issued Apr. 3, 2020 in European Patent Application No. 18783748.9, 6 pages.
Combined Chinese Office Action and Search Report issued Sep. 2, 2021 in Patent Application No. 201880024018.1 (with English machine translation), 21 pages.

(Continued)

*Primary Examiner* — Megan McCulley
(74) *Attorney, Agent, or Firm* — Oblon, McClelland, Maier & Neustadt, L.L.P.

(57) ABSTRACT

A sheet molding compound which is a thickened material of an epoxy resin composition, including a component (A), a component (B), and a component (C), in which the component (A) is an epoxy resin staying at a liquid state at 25° C., the component (B) is an acid anhydride, the component (C) is an epoxy resin curing agent, and in the thickened material, at least some of epoxy groups of the component (A) and at least some of carboxy groups derived from the component (B) form ester.

18 Claims, No Drawings

(56) References Cited

OTHER PUBLICATIONS

Notice of Reasons for Refusal issued Mar. 8, 2022 in Japanese Patent Application No. 2021-035293 (with English machine translation), 16 pages.
Office Action issued on Apr. 11, 2022, in corresponding to Chinese Patent Application No. 201880024018.1 (with English translation).
Office Action issued on Jun. 1, 2022, in corresponding to European Patent Application No. 18783748.9.
European Office Action issued Apr. 13, 2023 in European Patent application No. 18 783 748.9, 4 pages.
Office Action issued Feb. 20, 2024, in corresponding Japanese Patent Application No. 2022-153947 (with English Translation), 6 pages.

\* cited by examiner

SHEET MOLDING COMPOUND AND FIBER-REINFORCED COMPOSITE MATERIAL

CROSS REFERENCE TO RELATED APPLICATIONS

This application is a continuation of U.S. patent application Ser. No. 16/594,122, filed on Oct. 7, 2019, which is a continuation application of International Application PCT/JP2018/015027, filed on Apr. 10, 2018, and is based upon and claims the benefit of the priority of Japanese Patent Application No. 2017-079132, filed on Apr. 12, 2017, the disclosure of which is incorporated herein in its entirety by reference.

TECHNICAL FIELD

The present invention relates to a sheet molding compound and a fiber-reinforced composite material.

This application is a continuation application of International Application No. PCT/JP2018/015027, filed on Apr. 10, 2018, which claims the benefit of priority of the prior Japanese Patent Application No. 2017-079132, filed in Japan on Apr. 12, 2017, the content of which is incorporated herein by reference.

BACKGROUND ART

Owing to its excellent mechanical characteristics and the like, a carbon fiber-reinforced composite material formed of carbon fiber and a matrix resin is widely used for airplanes, automobiles, and industrial uses. In recent years, as the use of the carbon fiber-reinforced composite material has increased, the scope of application thereof has also widened. A matrix resin as the carbon fiber-reinforced composite material needs to express high mechanical characteristics even in a high-temperature environment. Furthermore, a matrix resin as a molding material (sheet molding compound (hereinafter, described as SMC as well), prepreg, or the like) used for manufacturing the carbon fiber-reinforced composite material needs to have excellent molding properties, As a matrix resin of a molding material, a resin composition containing a thermosetting resin, with which carbon fiber is excellently impregnated and which expresses excellent beat resistance after curing, is frequently used. As the thermosetting resin, a phenol resin, a melamine resin, a bismaleimide resin, an unsaturated polyester resin, an epoxy resin, and the like are used. Among these, the epoxy resin composition is suitable as a matrix resin because this resin has excellent molding properties, expresses excellent heat resistance after curing, and enables a carbon fiber-reinforced composite material prepared using the epoxy resin composition to exhibit high mechanical characteristics.

The method for manufacturing a carbon fiber-reinforced composite material by molding a molding material includes an autoclave molding method, a filament winding molding method, a resin injection molding method, a vacuum resin injection molding method, a press molding method, and the like. Among these, the press molding method is in an increasing demand because this method has high productivity and makes it easy to obtain a carbon fiber-reinforced composite material excellent in terms of design. As a molding material used in the press molding method, SMC constituted with reinforcing short fiber and a matrix resin is being actively used, because this material makes it possible to manufacture a carbon fiber-reinforced composite material having a complicated shape and produces a carbon fiber-reinforced composite material optimal for a structural member.

For the matrix resin used in SMC, the following characteristics are required.

In order for carbon fiber to be impregnated with the matrix resin at the time of manufacturing SMC, the matrix resin of SMC is required to have an extremely low viscosity at the time of manufacturing SMC.

In order to secure handleability of SMC at the time of press molding, the matrix resin of SMC is required to be in a B stage (a state where the matrix resin is thickened by semi-curing and can be fluidized by heating) by being appropriately thickened and to have appropriate tackiness (pressure sensitive adhesiveness) and draping properties (flexibility).

In order to secure fluidity of the matrix resin at the time of press molding, the matrix resin of SMC is required to maintain the B stage for a long period of time (B stage stability).

In order to form SMC within a short period time at a high temperature by the press molding method, the matrix resin of SMC is required to be cured within a short period of time and have high heat resistance after curing.

In order to secure mold release properties after press molding, the matrix resin of SMC is required to have high stiffness after curing.

In order to obtain a carbon fiber-reinforced composite material having high mechanical characteristics and high heat resistance, the matrix resin of SMC is required to be capable of expressing high mechanical characteristics and high heat resistance after curing.

Although the epoxy resin composition forms a cured material having excellent mechanical characteristics and heat resistance, it is difficult for the epoxy resin composition to satisfy both the quick curing properties and B stage stability.

That is, a curing agent curing the epoxy resin within a short period of time makes the curing reaction rapidly proceed at room temperature, the B stage of the epoxy resin composition cannot be maintained for a long period of time. In contrast, with a curing agent that can maintain the B stage of the epoxy resin composition for a long period of time, it is difficult to cure the epoxy resin within a short period of time.

Therefore, as the matrix resin of SMC, generally, a thermosetting resin composition obtained by diluting an unsaturated polyester resin or a vinyl ester resin with styrene is used. However, the thermosetting resin composition containing the unsaturated polyester resin or the vinyl ester resin causes serious cure shrinkage, there is a demand for the development of SMC using an epoxy resin composition that causes less cure shrinkage.

As the epoxy resin composition used in SMC, the following compositions are suggested.
 (1) Resin composition formed of a hydroxyl group-containing epoxy resin, polyol, and a polyisocyanate compound (PTL 1).
 (2) Resin composition formed of an epoxy resin, polyol, a polyisocyanate compound, dicyandiamide, and a specific imidazole compound (PTL 2).

As epoxy resin compositions used in adhesives, the following compositions are suggested.

(3) Liquid adhesive formed of an epoxy resin, a curing agent activated at a temperature of 20° C. to 100° C., and a curing agent activated at a temperature of 100° C. to 200° C. (PTL 3).

(4) Reactive hot melt adhesive containing an epoxy resin staying in a solid state at room temperature, an epoxy resin staying in a liquid state at room temperature, amino group-terminated linear polyoxypropylene, and a latent curing agent (dicyandiamide) (PTL 4).

As epoxy resin compositions used in prepreg, the following compositions are suggested.

(5) Resin composition for impregnation containing an epoxy resin, a latent curing agent, a resin having a polymerizable unsaturated group, and a polymerization initiator (PTL 5).

(6) Epoxy resin composition containing an epoxy resin, an acid anhydride, and a Lewis acid salt (boron trichloride amine complex) (PTL 6 to 8).

As an epoxy resin composition capable of causing an epoxy resin to stably shift to the B stage, the following composition is suggested.

(7) Resin composition containing an epoxy resin and 2,5-dimethyl-2,5-hexamethylenediamine and mencenediamine as curing agents (NPL 1).

CITATION LIST

Patent Literature

[PTL 1] Japanese Unexamined Patent Application, First Publication No. S58-191723
[PTL 2] Japanese Unexamined Patent Application, First Publication No. H4-088011
[PTL 3] Japanese Unexamined Patent Application, First Publication No. H2-088684
[PTL 4] Japanese Unexamined Patent Application, First Publication No. H2-088685
[PTL 5] Japanese Unexamined Patent Application, First Publication No. H2-286722
[PTL 6] Japanese Unexamined Patent Application, First Publication No. 2004-189811
[PTL 7] Japanese Unexamined Patent Application, First Publication No. 2004-43769
[PTL 8] Japanese Unexamined Patent Application, First Publication No. 2001-354788

Non-Patent Literature

[NPL 1] Masaki Shimbo, "Epoxy Resin Handbook", Nikkan Kyogyo Shimbun, Ltd., Dec. 25, 1987, p. 155

DISCLOSURE OF INVENTION

Technical Problem

The resin compositions described in (1) and (2) exploit a urethanation reaction. Accordingly, due to the influence of moisture in the resin compositions, a thickening reaction rate and the condition of the B stage significantly change. Therefore, it is difficult to secure the handleability and workability of SMC and the B stage stability.

The liquid adhesive described in (3) uses a curing agent (polyamine, mercaptan, isocyanate, imidazole, polyamide, polysulfide phenol, a BF₃ complex, ketimine, or the like) activated at a temperature of 20° C. to 100° C. Accordingly, this adhesive is gelated by a curing reaction as a first stage. Therefore, this adhesive exhibits low fluidity before curing as a second stage and is not easily bulked up, and consequently, cannot be used as a matrix resin of SMC.

(4) The reactive hot melt adhesive described in (4) has high viscosity, and reinforcing fiber cannot be excellently impregnated with the adhesive. Consequently, the adhesive cannot be used as a matrix resin of SMC.

PTL 5 describes that in a case where prepreg is manufactured using the resin composition for impregnation described in (5), a solvent is incorporated into the resin composition for impregnation, and heating is performed such that the solvent is removed and a curing reaction partially proceeds. With this method, a solvent is easily removed. Therefore, this method is applicable to the manufacturing of thin prepreg in which a temperature variation resulting from thickness at the time of heating and cooling is small. However, in a thick sheet such as SMC, it is difficult to remove a solvent, and a large temperature variation occurs. Therefore, a defective product is obtained in which the surface condition becomes different from the interior condition after the B stage.

The epoxy resin composition described in (6) consumes a long time until it shifts to the B stage at room temperature (23° C.). Furthermore, after the shift to the B stage at room temperature, the composition has low viscosity and extremely strong tackiness. Therefore, this composition is unsuitable for SMC.

The resin composition described in (7) contains 2,5-dimethyl-2,5-hexanediamine. Therefore, the pot life of the composition is short. In addition, because this resin composition contains mecenediamine, the curing properties thereof are insufficient. Accordingly, this composition is unsuitable for a matrix resin of SMC.

The present invention provides a sheet molding compound which is excellent in handleability (tackiness and draping properties) and fluidity and quick curing properties of a matrix resin at the time of pressing molding, can inhibit the occurrence of burrs, and makes it possible to obtain a fiber-reinforced composite material excellent in mold release properties, mechanical characteristics, and heat resistance; and a fiber-reinforced composite material excellent in mold release properties, mechanical characteristics, and heat resistance.

Solution to Problem

As a result of conducting an intensive examination, the inventors of the present invention have found that the above object can be achieved by using a specific epoxy resin, an acid anhydride, and an epoxy resin curing agent, and have accomplished the present invention.

The present invention has the following aspects.

[1] A sheet molding compound which is a thickened material of an epoxy resin composition, containing: a component (A), a component (B), and a component (C), in which the component (A) is an epoxy resin staying in a liquid state at 25° C., the component (B) is an acid anhydride, the component (C) is an epoxy resin curing agent, and in the thickened material, at least some of epoxy groups of the component (A) and at least some of carboxy groups derived from the component (B) form ester.

[2] The sheet molding compound described in [1], further containing reinforcing fiber.

[3] The sheet molding compound described in [1] or [2], in which a viscosity of the epoxy resin composition that is measured by viscometry (a) at 30° C. 30 minutes after the preparation of the composition is 0.5 to 15 Pa·s.

Viscometry (a): immediately after being prepared, the epoxy resin composition is put and sealed into an airtightable container and left to stand for 30 minutes at 23° C., and then a viscosity of the epoxy resin composition at 30° C. is measured.

[4] The sheet molding compound described in any one of [1] to [3], in which a viscosity of the epoxy resin composition that is measured by viscometry (b) at 30° C. 10 days after the preparation of the composition is 2,000 to 55,000 Pa·s.

Viscometry (b): immediately after being prepared, the epoxy resin composition is put and sealed into an airtightable container and left to stand for 10 days at 23° C., and then a viscosity of the epoxy resin composition at 30° C. is measured.

[5] The sheet molding compound described in any one of [1] to [3], in which a 1.5 viscosity of the epoxy resin composition that is measured by viscometry (c) at 30° C.: 20 days after the preparation of the composition is 2,000 to 100,000 Pa·s.

Viscometry (e): immediately after being prepared, the epoxy resin composition is put and sealed into an airtightable container and left to stand for 20 days at 23° C., and then a viscosity of the epoxy resin composition at 30° C. is measured.

[6] The sheet molding compound described in any one of [1] to [3], in which a viscosity of the epoxy resin composition that is measured by viscometry (b) at 30° C. 10 days after the preparation of the composition is 2,000 to 55.000 Pa·s, the viscosity of the epoxy resin composition that is measured by viscometry (c) at 30° C. 20 days after the preparation of the composition described below is 2,000 to 100,000 Pa·s, and a viscosity (b) measured by the viscometry (b) and a viscosity (c) measured by the viscometry (c) satisfy a relationship of [viscosity (c)]/[viscosity (b)]≤3.

Viscometry (b): immediately after being prepared, the epoxy resin composition is put and sealed into an airtightable container and left to stand for 10 days at 23° C., and then a viscosity of the epoxy resin composition at 30° C. is measured.

Viscometry (c): immediately after being prepared, the epoxy resin composition is put and sealed into an airtightable container and left to stand for 20 days at 23° C., and then a viscosity of the epoxy resin composition at 30° C. is measured.

[7] The sheet molding compound described in any one of [1] to [6], in which a content of the component (B) is such that the amount of acid anhydride groups with respect to I equivalent of epoxy groups contained in the epoxy resin composition becomes 0.1 to 0.5 equivalents.

[8] The sheet molding compound described in any one of [1] to [7], in which a content of the component (B) is 3 to 30 parts by mass with respect to 100 parts by mass of the entire epoxy resin contained in the epoxy resin composition.

[9] The sheet molding compound described in any one of [1] to [8], in which a content of the component (C) is 0.1 to 25 parts by mass with respect to 100 parts by mass of the entire epoxy resin contained in the epoxy resin composition.

[10] The sheet molding compound described in any one of [1] to [9], in which the component (A) contains a glycidyl amine-based epoxy resin.

[11] The sheet molding compound described in [10], in which a content of the glycidyl amine-based epoxy resin with respect to 100 parts by mass of the entire epoxy resin contained in the epoxy resin composition is 1 to 30 parts by mass.

[12] The sheet molding compound described in any one of [1] to [11], in which the component (B) stays in a liquid state at 25° C.

[13] The sheet molding compound described in any one of [1] to [12], in which the component (C) stays in a solid state at 25° C.

[14] The sheet molding compound described in any one of [1] to [13], in which the component (B) contains a compound having two cyclic acid anhydrides in a molecule.

[15] The sheet molding compound described in any one of [1] to [14], in which the component (B) contains a phthalic anhydride or a hydrogenated phthalic anhydride that may have a substituent.

[16] The sheet molding compound described in any one of [1] to [15], in which the component (B) contains a hydrogenated phthalic anhydride that may have a substituent, and the hydrogenated phthalic anhydride that may have a substituent is a compound represented by Formula (1) or a compound represented by Formula (2).

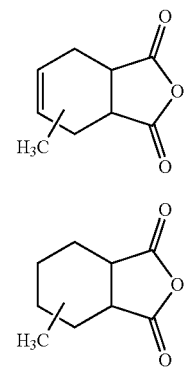

[17] The sheet molding compound described in any one of [1] to [16], in which the component (C) contains an imidazole-based compound having a melting point of 120° C. to 300° C.

[18] The sheet molding compound described in any one of [1] to [17], in which the epoxy resin composition further contains a component (D), the component (D) is dieyandiamide, and a content of the component (D) with respect to 100 parts by mass of the entire epoxy resin contained in the epoxy resin composition is 0.1 to 5 parts by mass.

[19] The sheet molding compound described in any one of [1] to [18], in which the component (C) further contains a component (E), the component (E) is an imidazole-based compound staying in a liquid state at 25° C., and a content of the component (E) with respect to 100 parts by mass of the entire epoxy resin contained in the epoxy resin composition is 0.01 to 0.2 parts by mass.

A fiber-reinforced composite material which is a cured material of the sheet molding compound described in any one of [1] to [19].

[21] The sheet molding compound described in [14], in which the compound having two cyclic acid anhydrides in a molecule is at least one kind of compound selected from the group consisting of glyceryl bisanhydrotrimellitate, ethylene glycol monoacetate, ethylene glycol bisanhydrotrimellitate, pyromellitic anhydride, benzophenone tetracarboxylic anhydride, 1,2,3,4-cyclobutane tetracarboxylic dianhydride, bicyclo[2.2.2]7-ene-2,3,5,6-tetracarboxylic dianhydride, diphenyl-3,3',4,4'-tetracarboxylic dianhydride, cyclopentane tetracarboxylic dianhydride, 1,2,4,5-cyclohexane tetracarboxylic dianhydride, 4-(2,5-dioxotetrahydrofuran-3-yl)-tetralin-1,2-dicarboxylic anhydride, 5-(2,5-dioxotetrahydrofuryl)-3-methyl-3-cyclohexene-1,2-dicarboxylic anhydride, N,N-bis[2-(2,6-dioxomorpholino)ethyl]glycine, 4,4'-sulfonyldiphthalic anhydride, 4,4'-ethylenebis(2,6-morpholinedione), 4,4'-(4,4'-isopropylidenediphenoxy)bis(phthalic anhydride), and 4,4'-(hexafluoroisopropylidene) diphthalic anhydride.

[22] The sheet molding compound described in [17], in which the imidazole-based compound having a melting point of 120° C. to 300° C. is 2,4-diamino-6-[2'-methylimidazolyl-(1')]-ethyl-s-triazine.

[23] The sheet molding compound described in [19], in which the component (E) is at least one kind of compound selected from the group consisting of 2-ethyl-4-methylimidazole, 1,2-dimethylimidazole, 1-benzyl-2-methylimidazole, and 1-benzyl-2-phenylimidazole.

[24] The sheet molding compound described in [10], in which the glycidyl amine-based epoxy resin is N,N,N',N'-tetraglycidyl-m-xylylenediamine.

Advantageous Effects of Invention

The sheet molding compound of the present invention is excellent in reinforcing fiber impregnation properties, B stage stability, handleability (tackiness and draping properties) after the shift to the B stage, storage stability, quick curing properties at the time of heating, and fluidity and quick curing properties of a matrix resin at the time of press molding, and less causes a burr in a die.

Furthermore the fiber-reinforced composite material of the present invention that is a cured material of the sheet molding compound is excellent in mold release properties, stiffness, mechanical characteristics, and heat resistance.

BEST MODE FOR CARRYING OUT THE INVENTION

The following definitions of terms are applied to the present specification and claims.

"Staying in a liquid state at 25° C." means that a substance stays in a liquid state under the condition of 25° C. and 1 atm.

"Staying in a solid state at 25° C." means that a substance stays in a solid state under the condition of 25° C. and 1 atm.

"Epoxy resin" is a compound having two or more epoxy groups in a molecule.

"Acid anhydride group" is a group having a structure formed in a case where one water molecule is removed from two acid groups (carboxy groups and the like).

"Acid anhydride" is a compound having an acid anhydride group.

"Hydrogenated phthalic anhydride" is a compound formed in a case where some or all of unsaturated carbon bonds in a benzene ring of phthalic anhydride are substituted with a saturated carbon bond.

"Viscosity" is a value measured using a rheometer under the condition of measurement mode: constant stress, stress level: 300 Pa, frequency: 1.59 Hz, plate diameter: 25 mm, plate type: parallel plate, and plate gap: 0.5 man.

"Burr" is an unnecessary portion which is formed at the end of a molded article by a resin flowing and solidified in voids of a die at the time of press molding.

"To" used for describing a range of numerical values means that the range includes numerical values listed before and after "to" as a lower limit and an upper limit.

<<Sheet Molding Compound>>

The sheet molding compound of the present invention is a thickened material of an epoxy resin composition which will be described later.

<Epoxy Resin Composition:>

The epoxy resin composition used in the present invention contains a component (A): epoxy resin staying in a liquid state at 25° C., a component (B): acid anhydride, and a component (C): epoxy resin curing agent.

Due to the action of the component (B) and the component (A), an ester bond is formed in the epoxy resin composition, and hence the composition is thickened immediately after being prepared. The sheet molding compound of the present invention is the thickened material.

The epoxy resin composition may further contain a component (D): dicyandiamide. In the epoxy resin composition of the present invention, the component (C) may further contain a component (E): imidazole-based compound staying in a liquid state at 25° C. As long as the effects of the present invention are not impaired, if necessary, the epoxy resin composition used in the present invention may contain other components.

The viscosity of the epoxy resin composition that is measured by the following viscometry (a) at 30° C. 30 minutes after the preparation of the composition is preferably 0.5 to 15 Pa·s, more preferably 0.5 to 10 Pa·s, and even more preferably 1 to 5 Pa·s. In a case where the viscosity measured at 30° C. 30 minutes after the preparation of the composition is equal to or higher than 0.5 Pa·s and more preferably equal to or higher than 1 Pa·s, at the time of manufacturing the sheet molding compound of the present invention, the accuracy of a basis weight (thickness of the epoxy resin composition) at the time of coating a film with the epoxy resin composition tends to be easily stabilized. Furthermore, in a case where the viscosity measured at 30° C. 30 minutes after the preparation of the composition is equal to or lower than 15 Pa·s, more preferably equal to or lower than 10 Pa·s, and even more preferably equal to or lower than 5 Pa·s, at the time of manufacturing the sheet molding compound by using the epoxy resin composition, reinforcing fiber, and the like, the reinforcing fiber tends to be impregnated better with the epoxy resin composition.

Viscometry (a): immediately after being prepared, the epoxy resin composition is put and sealed into an airtightable container and left to stand for 30 minutes at 23° C. and then a viscosity of the epoxy resin composition at 30° C. is measured.

The viscosity of the epoxy resin composition measured by the following viscometry (b) at 30° C. 10 days after the preparation of the composition is preferably 2,000 to 55,000 Pa·s, more preferably 2,000 to 42,000 Pa·s, and even more preferably 4,000 to 20,000 Pa·s. In a case where the viscosity measured at 30° C. 10 days after the preparation of the composition is equal to or higher than 2,000 Pa·s, and more preferably equal to or higher than 4,000 Pa·s, at the time of handling the sheet molding compound, the surface tackiness tends to be reduced. In a case where the viscosity measured at 30° C. 10 days after the preparation of the composition is equal to or lower than 55,000 Pa·s, more preferably equal to or lower than 42,000 Pa·s, and even more preferably equal to or lower than 20,000 Pa·s, the draping properties of the sheet molding compound fall into an appropriate range, and the handleability tend to become excellent.

Viscometry (b): immediately after being prepared, the epoxy resin composition is put and sealed into an airtightable container and left to stand for 10 days at 23° C., and then a viscosity of the epoxy resin composition at 30° C. is measured.

The viscosity of the epoxy resin composition measured by the following viscometry (c) at 30° C. 20 days after the preparation of the composition is preferably 2,000 to 100,000 Pa·s, more preferably 4,000 to 80,000 Pa·s, and even more preferably 5,000 to 70,000 Pa·s. In a case where the viscosity measured at 30° C. 20 days after the preparation of the composition is equal to or higher than 2,000 Pa·s, more preferably equal to or higher than 4,000 Pa·s, and even more preferably equal to or higher than 5,000 Pa·s, at the time of handling the sheet molding compound, the surface tackiness tends to be reduced. In a case where the viscosity measured at 30° C.: 20 days after the preparation of the composition is equal to or lower than 100,000 Pa·s, more preferably equal to or lower than 80,000 Pa·s, and even more preferably equal to or lower than 70,000 Pa·s, the draping properties of the sheet molding compound fall into an appropriate range, and the handleability tends to become excellent.

In a case where the viscosity measured at 30° C. 20 days after the preparation of the composition is within the above range, it is understood that the composition is capable of maintaining the B stage for a long period of time (B stage stability is excellent).

It is preferable that a viscosity (b) measured by the viscometry (b) and a viscosity (c) measured by the viscometry (c) satisfy a relationship of [viscosity (c)]/[viscosity (b)]≤3, because then the B stage stability tends to be further improved, the viscosity of the sheet molding compound tends to change less over time, and the storage stability tends to become excellent. [Viscosity (c)]/[viscosity (b)] is more preferably within a range of 0.3 to 3, and even more preferably within a range of 0.5 to 3.

(Component (A))

The component (A) is an epoxy resin staying in a liquid state at 25° C.

The component (A) is a component which adjusts the viscosity of the epoxy resin composition to be within the above range such that reinforcing fiber is impregnated better with the epoxy resin composition at the time of manufacturing the sheet molding compound. Furthermore, the component (A) is a component which improves the mechanical characteristics and heat resistance of a fiber-reinforced composite material which is a cured material of the sheet molding compound. In a case where the component (A) has an aromatic ring, it is easy to adjust the mechanical characteristics of the fiber-reinforced composite material to be within a desired range.

Examples of the component (A) include glycidyl ether of bisphenols (bisphenol A, bisphenol F, bisphenol AD, halogen-substituted bisphenols A, F, and AD, and the like); glycidyl ether of polyphenols obtained by a condensation reaction between phenols and an aromatic carbonyl compound; glycidyl ether of polyols (polyoxyalkylene bisphenol A and the like); a polyglycidyl compound derived from aromatic amines; and the like.

As the component (A), a bisphenol-type epoxy resin is preferable, because this resin makes it easy to adjust the viscosity of the epoxy resin composition to be appropriate for impregnating reinforcing fiber with the composition, and makes it easy to adjust the mechanical characteristics of the fiber-reinforced composite material to be within a desired range.

As the bisphenol-type epoxy resin, a difunctional bisphenol-type epoxy resin is preferable. A bisphenol A-type epoxy resin is more preferable, because the heat resistance and the chemical resistance of the fiber-reinforced composite material become excellent. A bisphenol F-type epoxy resin is more preferable, because the viscosity of this resin is lower than that of the bisphenol A-type epoxy resin having the approximately same molecular weight, and the elastic modulus of the fiber-reinforced composite material becomes high.

Herein, "difunctioinal bisphenol-type epoxy resin" means a bisphenol-type epoxy resin having two epoxy groups in a molecule.

The component (A) may be an epoxy resin having three or more functional groups. A trifunctional epoxy resin and a tetrafunctional epoxy resin can further improve the beat resistance of the fiber-reinforced composite material without significantly change the viscosity of the epoxy resin composition.

Herein, "trifunctional epoxy resin" means a resin having three epoxy groups in a molecule. "Tetrafunctional epoxy resin" means a resin having four epoxy groups in a molecule.

Examples of commercial products of the difunctional bisphenol-type epoxy resin include the following ones.

jER (registered trademark) 825, 827, 828, 828EL, 828XA, 806, 806H, 807, 4004P, 4005P, 4007P, and 4010P manufactured by Mitsubishi Chemical Corporation, EPICLON (registered trademark) 840, 840-S, 850, 850-S, EXA-850CRP, 850-LC, 830, 830-S, 835, EXA-830CRP, EXA-830LVP, and EXA-835LV manufactured by DIC Corporation, EPOTORT (registered trademark) YD-115, YD-115G, YD-115CA, YD-118T, YD-127, YD-128, YD-128G, YD-128S, YD-128CA, YDF-170, YDF-2001, YDF-2004, and YDF-2005RL manufactured by NIPPON STEEL & SUMIKIN CHEMICAL CO., LTD., and the like.

Examples of commercial products of the component (A) having two or more functional groups include the following ones.

jER (registered trademark) 152, 154, 157570, 1031S, 1032H60, 604, 630, and 630LSD manufactured by Mitsubishi Chemical Corporation, N-730A. N-740, N-770, N-775, N-740-80M, N-770-70M, N-865, N-865-80M, N-660, N-665, N-670, N-673, N-680, N-690, N-695, N-665-EXP, N-672-EXP. N-655-EXP-S, N-662-EXP-S, N-665-EXP-S, N-670-EXP-S, N-685-EXP-S, and HP-5000 manufactured by DIC Corporation, TETRAD-X manufactured by Mitsubishi Chemical Corporation, and the like. Particularly, in a case where the component (A) contains a glycidyl amine-based epoxy resin such as TETRAD-X, it is possible to hasten the temporal change of viscosity of the epoxy resin composition. That is, in a case where the content of the glycidyl amine-based epoxy resin is adjusted, the viscosity (b) or the viscosity (c) can be controlled, the shift to the B stage proceeds within a short period of time at the time of manufacturing the sheet molding compound, and accordingly, the productivity thereof can be increased.

In a case where the glycidyl amine-based epoxy resin is used, the content of the resin is preferably about 1% to 30% by mass with respect to 100% by mass of the component (A). The content of the glycidyl amine-based epoxy resin is more preferably 2% to 20% by mass, and even more preferably 3% to 15% by mass. In a case where the content of the glycidyl amine-based epoxy resin is equal to or greater than 1% by mass, more preferably equal to or greater than 2% by mass, and even more preferably equal to or greater than 3% by mass, the time taken for the sheet molding compound to shift to the B stage tends to be suitably reduced. Furthermore, in a case where the content of the glycidyl amine-based epoxy resin is equal to or smaller than 30% by mass, more preferably equal to or smaller than 20% by mass, and even more preferably equal to or smaller than 15% by mass, the storage stability of the sheet molding compound tends to be improved.

One kind of component (A) may be used singly, or two or more kinds of components (A) may be used in combination.

The content of the component (A) in the epoxy resin composition used in the present invention may be set such that the viscosity of the epoxy resin composition measured at 30° C. 30 minutes after the preparation of the composition becomes 0.5 to 15 Pa·s. The content of the component (A) varies with the type of the component (A).

The content of the component (A) with respect to 100 parts by mass of the entire epoxy resin contained in the epoxy resin composition is preferably 20% to 100% by mass, and more preferably 50% to 95% by mass. In a case where the content of the component (A) is within the above range, it is easy to adjust the viscosity of the epoxy resin composition to be within the above range, and the reinforcing fiber impregnation properties are improved. Furthermore, the heat resistance of the fiber-reinforced composite material is improved.

(Component (B))

The component (B) is an acid anhydride.

The component (B) is a component which can act on the component (A) at room temperature and thickens the epoxy resin composition immediately after the composition is prepared such that the sheet molding compound shifts to the B stage.

It is preferable that the component (B) stays in a liquid state at 25° C. In a case where the component (B) has the above properties, the components in the epoxy resin composition can be uniformly mixed together, and the epoxy resin composition can be uniformly thickened.

Examples of the component (B) include a cyclic acid anhydride having a structure formed in a case where one or more water molecules are removed from two or more acids in a molecule. The cyclic acid anhydride includes a compound having one cyclic acid anhydride group or two or more cyclic acid anhydride groups in a molecule.

Examples of the compound having one cyclic acid anhydride group include dodecenyl succinic anhydride, polyadipic anhydride, polyazelaic anhydride, methyl tetrahydrophthalic anhydride, methyl hexahydrophthalic anhydride, methyl himic anhydride, hexahydrophthalic anhydride, phthalic anhydride, trimellitic anhydride, 3-acetamidophthalic anhydride, 4-pentene-1,2-dicarboxylic anhydride, 6-bromo-1,2-dihydro-4H-3,1-benzoxazine-2,4-dione, 2,3-anthracene dicarboxylic anhydride, and the like.

Examples of the compound having two cyclic acid anhydride groups include glyceryl bisanhydrotrimellitate mono-acetate, ethylene glycol bisanhydrotrimellitate, 1.5 pyromellitic anhydride, benzophenone tetracarboxylic anhydride, 1,2,3,4-cyclobutane tetracarboxylic dianhydride, bicyclo[2.2.2]-oct-7-ene-2,3,5,6-tetracarboxylic dianhydride, diphenyl-3,3',4,4'-tetracarboxylic dianhydride, cyclopentane tetracarboxylic dianhydride, 1,2,4,5-cyclohexane tetracarboxylic dianhydride, 4-(2,5-dioxotetrahydrofuran-3-yl)-tetralin-1,2-dicarboxylic anhydride, 5-(2,5-dioxotetrahydrofuryl)-3-methyl-3-cyclohexene-1,2-dicarboxylic anhydride, N,N-bis[2-(2,6-dioxomorpholino)ethyl]glycine, 4,4'-sulfonyldiphthalic anhydride, 4,4'-ethylenebis(2,6-morpholinedione), 4,4'-(4,4'-isopropylidenediphenoxy)bis(phthalic anhydride), 4,4'-(hexafluoroisopropylidene) diphthalic anhydride, and the like.

As the component (B), in view of the stability of viscosity of the epoxy resin composition and the heat resistance or mechanical characteristics of the cured material of the epoxy resin composition, phthalic anhydride or hydrogenated phthalic anhydride which may have a substituent is preferable, and a compound represented by Formula (1) or a compound represented by Formula (2) is more preferable.

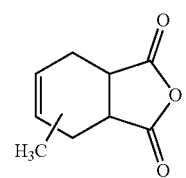

(1)

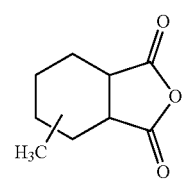

(2)

As the component (B), it is preferable to use a compound having two cyclic acid anhydrides in a molecule, because then the occurrence of burrs at the time of press molding can be reduced.

One kind of component (B) may be used singly, or two or more kinds of components (B) may be used in combination.

The content of the component (B) is preferably set such that the amount of acid anhydride groups with respect to 1 equivalent of epoxy groups contained in the epoxy resin composition becomes 0.1 to 0.5 equivalents, more preferably set such that the amount of the acid anhydride groups becomes 0.1 to 0.4 equivalents, and even more preferably set such that the amount of the acid anhydride groups becomes 0.1 to 0.3 equivalents. In a case where the content of the component (B) is within the above range, the sheet molding compound appropriately shifts to the B stage. In a case where the content of the component (B) is equal to or greater than the lower limit of the above range, the sheet molding compound tends to excellently shift to the B stage, appropriate tackiness tends to be obtained, and the mold release properties of a carrier film from the sheet molding compound tends to become excellent. In a case where the content of the component (B) is equal to or smaller than the upper limit of the above range, the sheet molding compound tends to appropriately shift to the B stage, excellent draping properties tend to be obtained, and the workability of cutting, lamination, and the like of the sheet molding compound tends to become excellent.

The content of the component (B) with respect to 100 parts by mass of the entire epoxy resin contained in the epoxy resin composition is preferably 3 to 30 parts by mass. The content of the component (B) is more preferably 5 to 25 parts by mass, and even more preferably 8 to 20 parts by mass. In a case where the content of the component (B) is within the above range, the sheet molding compound appropriately shifts to the B stage. In a case where the content of the component (B) with respect to 100 parts by mass of the entire epoxy resin contained in the epoxy resin composition is equal to or greater than 3 parts by mass, more preferably equal to or greater than 5 parts by mass, and even more preferably equal to or greater than 8 parts by mass, the sheet molding compound tends to excellently shift to the B stage, appropriate tackiness tends to be obtained, and the release properties of a carrier film from the sheet molding compound tend to become excellent. In a case where the content of the component (B) with respect to 100 parts by mass of the entire epoxy resin contained in the epoxy resin composition is equal to or smaller than 30 parts by mass, more preferably equal to or smaller than 25 parts by mass, and even more preferably equal to or smaller than 20 parts by mass, the sheet molding compound tends to appropriately shift to the B stage, excellent draping properties tend to be obtained, and the workability of cutting, lamination, and the like of the sheet molding compound tends to become excellent.

In a case where the aforementioned compound having two cyclic acid anhydrides in a molecule is used as the component (B), the content of the compound with respect to 100 parts by mass of the entire epoxy resin contained in the epoxy resin composition is preferably 1 to 20 parts by mass. The content of the compound is more preferably 1 to 10 parts by mass, and even more preferably 1 to 5 parts by mass.

In a case where the content of the compound having two cyclic acid anhydrides in a molecule is equal to or greater than 1 parts by mass with respect to 100 parts by mass of the entire epoxy resin contained in the epoxy resin composition, the occurrence of burrs at the time of press-molding the sheet molding compound tends to be reduced. Furthermore, in a case where the content of the compound having two cyclic acid anhydrides in a molecule with respect to 100 parts by mass of the entire epoxy resin contained in the epoxy resin composition is equal to or smaller than 20% by mass, more preferably equal to or smaller than 10 parts by mass, and even more preferably equal to or smaller than 5 parts by mass, the fluidity of the sheet molding compound in a molding die at the time of press molding tends to become excellent.

(Component (C))

The component (C) is an epoxy resin curing agent.

The component (C) is a component which functions as a curing agent for the epoxy resin and acts as a catalyst so as to cause the component (A) and the component (B) to react with each other at room temperature at the time of shift to the B stage during which the component (A) and the component (B) react with each other.

It is preferable that the component (C) stays in a solid state at 25° C. In a case where the component (C) has the above properties, the reaction of the component (C) tends to be inhibited at the time of manufacturing the sheet molding compound or at the time of storing the manufactured sheet molding compound, and the productivity, storage stability, handleability, fluidity at the time of molding, and the like of the sheet molding compound tend to become excellent.

Examples of the component (C) include aliphatic amine, aromatic amine, modified amine, secondary amine, tertiary amine, an imidazole-based compound, mercaptans, and the like.

As the component (C), in view of the storage stability of the sheet molding compound containing the epoxy resin composition described above, an imidazole-based compound having a melting point of 120° C. to 300° C. is preferable. For example, 2,4-diamino-6-[2'-methylimidazolyl-(1')]-ethyl-s-triazine can be suitably used.

In a case where an imidazole-based compound staying in a liquid state at 25° C. (hereinafter, referred to as component (E) as well) is used as the component (C), it is possible to reduce the time taken for the sheet molding compound to shift to the B stage.

Examples of the component (E) include 2-ethyl-4-methylimidazole, 1,2-dimethylimidazole, 1-benzyl-2-methylimidazole, 1-benzyl-2-phenylimidazole, and the like.

The content of the component (E) with respect to 100 parts by mass of the entire epoxy resin contained in the epoxy resin composition is preferably 0.01 to 0.2 parts by mass, more preferably 0.01 to 0.1 parts by mass, and even more preferably 0.03 to 0.07 parts by mass. In a case where the content is equal to or greater than 0.01 parts by mass, and preferably equal to or greater than 0.03 parts by mass, the time taken for the sheet molding compound to shift to the B stage tends to be reduced. Furthermore, in a case where the content is equal to or smaller than 0.2 parts by mass, more preferably equal to or smaller than 0.1 part by mass, and even more preferably equal to or smaller than 0.07 parts by mass, the stability of the shift to the B stage of the sheet molding compound tends to become excellent.

One kind of component (C) may be used singly, or two or more kinds of components (C) may be used in combination.

The content of the component (C) with respect to 100 parts by mass of the entire epoxy resin contained in the epoxy resin composition is preferably 0.1 to 25 parts by mass, more preferably 2 to 10 parts by mass, and even more preferably 3 to 7 parts by mass. In a case where the content of the component (C) is equal to or greater than 0.1 parts by mass, more preferably equal to or greater than 2 parts by mass, and even more preferably equal to or greater than 3 parts by mass, the quick curing properties at the time of molding the sheet molding compound tends to become excellent. Furthermore, in a case where the content of the component (C) is equal to or smaller than 25 parts by mass, more preferably equal to or smaller than 10 parts by mass, and even more preferably equal to or smaller than 7 parts by mass, the stability of the B stage at the time of manufacturing the sheet molding compound tends to become excellent.

In some cases, the particle diameter of the component (C) at 25° C. affects the characteristics of the sheet molding compound. For example, in a case where the particle diameter of the component (C) is large, the surface area of the component (C) becomes small, and in order to cure the epoxy resin composition within a short period of time, sometimes the content of the component (C) needs to be increased. In a case where the particle diameter of the component (C) is large, the proportion of the epoxy resin composition that enters the interior of reinforcing fiber is reduced, and consequently, sometimes the time taken for curing is increased. The average particle diameter of the component (C) is preferably equal to or smaller than 25 μm, and more preferably equal to or smaller than 15 μm. More specifically, the average particle diameter of the component (C) is preferably larger than 0 μm and equal to or smaller than 25 μm, and more preferably 1 to 15 μm.

The average particle diameter can be measured using a particle size distribution analyzer adopting an image analysis method, a laser diffraction scattering method, a Coulter method, a centrifugal precipitation method, or the like as measurement principle.

(Component (D))

The component (D) is dicyandiamide.

In a case where the epoxy resin composition described above further contains dicyandiamide, it is possible to further improve the toughness and heat resistance of the cured material of the sheet molding compound obtained from the epoxy resin composition without impairing the shift to the B stage of the sheet molding compound and the stability thereof as well as the quick curing properties.

The content of the component (D) with respect to 100 parts by mass of the entire epoxy resin contained in the epoxy resin composition is preferably 0.1 to 5 parts by mass, more preferably 0.3 to 5 parts by mass, and even more preferably 1 to 4 parts by mass. In a case where the content of the component (D) is equal to or greater than 0.1 parts by mass, more preferably equal to or greater than 0.3 parts by mass, and even more preferably equal to or greater than 1 part by mass, the toughness or heat resistance of the cured material of the sheet molding compound tends to become excellent. Furthermore, in a case where the content of the component (D) is equal to or smaller than 5 parts by mass and more preferably equal to or smaller than 4 parts by mass, the B stage stability at the time of manufacturing the sheet molding compound tends to become excellent.

(Other Components)

Examples of other components that the aforementioned epoxy resin composition may contain if necessary include a curing accelerator for an epoxy resin, an inorganic filler, an internal release agent, a surfactant, an organic pigment, an inorganic pigment, an epoxy resin composition other than the component (A), other resins (a thermoplastic resin, a thermoplastic elastomer, and an elastomer), and the like.

As the curing accelerator, a urea compound is preferable because this compound improves the mechanical characteristics (bending strength and flexural modulus) of the fiber-reinforced composite material.

Examples of the urea compound include 3-phenyl-1,1-dimethylurea, 3-(3,4-dichlorophenyl)-1,1-dimethylurea, 3-(3-chloro-4-methylphenyl)-1,1-dimethylurea, 2,4-bis(3,3-dimethylureide)toluene, 1,1'-(4-methyl-1,3-phenylene)bis(3,3-dimethylurea), and the like.

Examples of the inorganic filler include calcium carbonate, aluminum hydroxide, clay, barium sulfate, magnesium oxide, glass powder, hollow glass beads, aerosil, and the like.

Examples of the internal release agent include carnauba wax, zinc stearate, calcium stearate, and the like.

In a case where the epoxy resin composition contains a surfactant, the release properties of a carrier film from the sheet molding compound can be improved. Furthermore, voids included in the sheet molding compound can be reduced.

Examples of the epoxy resin other than the component (A) include an epoxy resin which stays in a semi-solid state or solid state at 25° C. As the epoxy resin other than the component (A), an epoxy resin having an aromatic ring is preferable, and a difunctional epoxy resin is more preferable. Furthermore, in addition to the difunctional epoxy resin, for the purpose of improving the heat resistance of the cured material or controlling the viscosity of the epoxy resin composition, various epoxy resins may be incorporated into the epoxy resin composition of the present invention. For improving the heat resistance, a polyfunctional epoxy resin, a novolac-type epoxy resin, or an epoxy resin having a naphthalene skeleton is effective.

By changing the viscoelasticity of the epoxy resin composition, the thermoplastic resin, the thermoplastic elastomer, and the elastomer make the epoxy resin composition have appropriate viscosity, appropriate storage modulus, and appropriate thixotropic properties and improve the toughness of the cured material of the epoxy resin composition. One kind of each of the thermoplastic elastomer, the thermoplastic elastomer, and the elastomer may be used singly, or two or more kinds of these may be used in combination.

(Method for Preparing Epoxy Resin Composition)

The epoxy resin composition of the present invention can be prepared by the method known in the related art. For example, the epoxy resin composition may be prepared by mixing together the components at the same time. Alternatively, by appropriately dispersing the component (B), the component (C), and the like separately in the component (A) in advance, a master batch may be prepared, and the epoxy resin composition may be prepared using the master batch. Furthermore, in a case where the internal temperature of the system is increased due to the shear heating caused by kneading and the like, it is preferable to implement a method for inhibiting the increase of temperature, such as controlling the kneading speed or cooling the preparation kiln or the kneading kiln. Examples of kneading devices include an electric mortar, attritor, a planetary mixer, a dissolver, a triple roll, a kneader, an all-purpose stirrer, a homogenizer, a homodispenser, a ball mill, a beads mill, and the like. Two or more kinds of kneading devices may be used in combination.

(Operation and Effect)

The epoxy resin composition used in the present invention described above contains the component (A): epoxy resin staying in a liquid state at 25° C. as a main component, and accordingly, the viscosity of the just prepared composition can be reduced. For example, after 30 minutes, the viscosity of the epoxy resin composition at 30° C. can be equal to or lower than 15 Pa·s. Therefore, reinforcing fiber can be excellently impregnated with the epoxy resin composition, and the epoxy resin composition can be suitably used for manufacturing the sheet molding compound.

Furthermore, the epoxy resin composition can be thickened within a short period of time after being prepared. For example, the viscosity of the epoxy resin composition measured at 30° C. 10 days after the preparation of the composition can be 2,000 to 55,000 Pa·s. Therefore, the surface tackiness can be reduced at the time of handling the sheet molding compound, and appropriate draping properties can be obtained. Accordingly, excellent handleability can be obtained.

In addition, the viscosity of the thickened epoxy resin composition can be maintained for a long period of time. For example, the viscosity of the epoxy resin composition measured at 30° C. 20 days after the preparation of the composition can be 2,000 to 100,000 Pa·s. Therefore, the tackiness and draping properties after the shift to the B stage and the B stage stability become excellent.

Moreover, because the epoxy resin composition contains the component (A), the stiffness, mechanical characteristics, and heat resistance of the cured material of the sheet molding compound are excellent.

(Reinforcing Fiber)

The sheet molding compound may contain reinforcing fiber. As the reinforcing fiber, various fibers can be adopted according to the use or usage purpose of the sheet molding compound. Examples thereof include carbon fiber (including graphite fiber, the same is true for the following description), aramid fiber, silicon carbide fiber, alumina fiber, boron fiber, tungsten carbide fiber, glass fiber, and the like. In view of mechanical characteristics of the fiber-reinforced composite material, carbon fiber and glass fiber are preferable, and carbon fiber is particularly preferable.

Usually, the reinforcing fiber is used in the form of a reinforcing fiber tow constituted with 1,000 to 60.000 filaments. In a molding material, the reinforcing fiber is present by maintaining the form of the reinforcing fiber tow, or present by being further divided into tows constituted with fewer filaments. Usually, in SMC, the reinforcing fiber is present by being further divided into smaller tows.

As the reinforcing fiber in SMC, chopped reinforcing fiber tows constituted with short fiber are preferable. The length of the short fiber is preferably 0.3 to 10 cm, and more preferably 1 to 5 cm. In a case where the length of the short fiber is equal to or greater than 0.3 cm, a fiber-reinforced composite material having excellent mechanical characteristics is obtained. In a case where the length of the short fiber is equal to or smaller than 10 cm, SMC exhibiting excellent fluidity at the time of press molding is obtained.

It is more preferable that the reinforcing fiber in SMC is in the form of a sheet constituted with chopped reinforcing fiber tows that are two-dimensionally and randomly stacked.

(Method for Manufacturing SMC)

For example, SMC is manufactured by sufficiently impregnating a sheet-like substance formed of the chopped reinforcing fiber tows with the epoxy resin composition and thickening the epoxy resin composition.

In a case where reinforcing fiber is impregnated with the epoxy resin composition by a known method appropriate for the form of the reinforcing fiber and then held as it is for several days to tens of days at a temperature of about room temperature to 60° C. or for several seconds to tens of minutes at a temperature of about 60° C. to 80° C., an epoxy group, which is contained in the component (A) in the epoxy resin composition and other epoxy resins optionally mixed in, and a carboxy group derived from the component (B) cause a esterification reaction, and accordingly, the epoxy resin composition shifts to the B stage.

It is preferable to select the reaction condition for the epoxy group contained in the epoxy resin and the carboxy group derived from the component (B) such that the viscosity of the thickened material of the epoxy resin composition obtained after the esterification reaction that is measured at 30° C. falls into the range described above.

As the method for impregnating the sheet-like substance of the chopped reinforcing fiber tow with the epoxy resin composition, various methods known in the related art can be adopted. For example, the following method can be adopted. Two sheets of films uniformly coated with the epoxy resin composition are prepared. Chopped reinforcing fiber tows are randomly scattered on the surface of one of the films coated with the epoxy resin composition, thereby obtaining a sheet-like substance. The surface of the other film coated with the epoxy resin composition is bonded to the surface of the sheet-like substance, and the sheet-like substance is pressed so as to be impregnated with the epoxy resin composition. Then, the epoxy resin composition is allowed to be thickened. In this way, SMC with suppressed surface tackiness that is suitable for a molding operation is obtained.

(Operation and Effect)

SMC of the present invention described above contains the thickened material of the epoxy resin composition exhibiting excellent tackiness and draping properties after the shift to the B stage. Therefore, the SMC has excellent handleability (tackiness and draping properties).

Furthermore, SMC of the present invention contains the thickened material of the epoxy resin composition of the present invention that is excellent in the B stage stability. Therefore, the SMC is excellent in the fluidity of the matrix resin at the time of press molding and can inhibit the occurrence of burrs in a die.

In addition, SMC of the present invention exhibits excellent quick curing properties at the time of press molding. Due to the high curing speed at the time of press molding, the SMC stays in a die for a short period of time, and hence the productivity of the fiber-reinforced composite material is improved.

Moreover, SMC of the present invention contains the thickened material of the epoxy resin composition producing a cured material excellent in stiffness, mechanical characteristics, and heat resistance. Therefore, from the SMC, it is possible to obtain a fiber-reinforced composite material excellent in mold release properties, mechanical characteristics, and heat resistance.

<Fiber-Reinforced Composite Material>

The fiber-reinforced composite material of the present invention is a cured material of SMC of the present invention.

The fiber-reinforced composite material of the present invention is manufactured by heat-molding SMC and curing the epoxy resin composition having shifted to the B stage.

Examples of the method for manufacturing the fiber-reinforced composite material by using SMC include the following method.

One sheet of SMC or a substance constituted with a plurality of sheets of stacked SMC is set between a pair of dies. SMC is heated and compressed for 2 to 60 minutes at a temperature of 120° C. to 230° C. such that the epoxy resin composition is cured, thereby obtaining a fiber-reinforced composite material as a molded article. As a core material, a honeycomb structure such as a corrugated board may be used, and SMC may be disposed on either or both of the surfaces thereof.

(Operation and Effect)

The fiber-reinforced composite material of the present invention described above is a cured material of SMC of the present invention. Therefore, the material is excellent in mold release properties, mechanical characteristics, and heat resistance.

Other Embodiments

The present invention is not limited to the embodiments described above, and can be modified in various ways within the scope of claims. The embodiments, which are obtained by appropriately combining technical means described in the above embodiments with other embodiments, are also included in the technical scope of the present invention.

EXAMPLES

Hereinafter, the present invention will be more specifically described based on examples, but the present invention is not limited thereto.

<Components>
(Component (A))
- jER (registered trademark) 828: bisphenol A-type liquid epoxy resin (manufactured by Mitsubishi Chemical Corporation, viscosity at 25° C.: 12 Pa·s)
- jER (registered trademark) 807: bisphenol F-type liquid epoxy resin (manufactured by Mitsubishi Chemical Corporation, viscosity at 25° C.: 4 Pa·s)
- jER (registered trademark) 604: tetraglycidyldiamine diphenylmethane (manufactured by Mitsubishi Chemical Corporation, viscosity at 25° C.: 360 Pa·s)
- jER (registered trademark) 630: triglycidyl-p-aminophenol (manufactured by Mitsubishi Chemical Corporation, viscosity at 25° C.: 0.7 Pa·s)
- TETRAD-X: N,N,N',N'-tetraglycidyl-m-xylylenediamine (manufactured by Mitsubishi Chemical Corporation, viscosity at 25° C.: 2 Pa·s)

(Component (B))
- HN-2200: 3-methyl-1,2,3,6-tetrahydrophthalic anhydride or 4-methyl-1,2,3,6-tetrahydrophthalic anhydride (manufactured by Hitachi Chemical Co., Ltd., viscosity at 25° C.: 75 mPa·s)
- HN-2000: 3-methyl-1,2,3,6-tetrahydrophthalic anhydride or 4-methyl-1,2,3,6-tetrahydrophthalic anhydride (manufactured by Hitachi Chemical Co., Ltd., viscosity at 25° C.: 40 mPa·s)
- HN-5500: 3-methyl-hexahydrophthalic anhydride or 4-methyl-hexahydrophthalic anhydride (manufactured by Hitachi Chemical Co., Ltd., viscosity at 25° C.: 75 mPa·s)
- MHAC-P: methyl-5-norbornene-2,3-dicarboxylic anhydride (manufactured by Hitachi Chemical Co., Ltd., viscosity at 25° C.: 225 mPa·s)
- HN-2200: 3-methyl-1,2,3,6-tetrahydrophthalic anhydride or 4-methyl-1,2,3,6-tetrahydrophthalic anhydride (manufactured by Hitachi Chemical Co., Ltd.)
- MH-700: mixture of 4-methyl-hexahydrophthalic anhydride and hexahydrophthalic anhydride (manufactured by New Japan Chemical Co., Ltd.)
- TMEG-600: ethylene glycol bis(anhydrotrimellitate) (manufactured by New Japan Chemical Co., Ltd.)
- MTA-15: mixture of 4-methyl-hexahydrophthalic anhydride, hexahydrophthalic anhydride, and glycerylbis(anhydrotrimellitate) monoacetate (manufactured by New Japan Chemical Co., Ltd.)

(Component (C))
- 2MZA-PW: 2,4-diamino-6-[2'-methylimidazole-(1')]-ethyl-s-triazine (manufactured by SHIKOKU CHEMICALS CORPORATION, melting point: 253° C.)

(Component (D))
- DICYANEX 1400F: dicyandiamide (manufactured by Air Products and Chemicals, Inc.)

(Component (E))
- 2E4MZ: 2-ethyl-4-methylimidazole (manufactured by SHIKOKU CHEMICALS CORPORATION, melting point: 40° C.)

(Other Components)
- Omicure (registered trademark) 24: 2,4-di (N,N-dimethylureide) toluene (manufactured by PTI Japan, Ltd.)
- DY9577: boron trichloride amine complex (manufactured by Huntsman Corporation, melting point: 28° C. to 35° C.)

(Preparation of Master Batch)

Each of DICYANEX 1400F, 2MZA-PW, and TMEG-600 was mixed with jER (registered trademark) 828 at 1:1 (mass ratio). The mixtures were kneaded using a triple roll, thereby obtaining a master batch.

<Preparation of Epoxy Resin Composition>

Examples 1 to 23 and Comparative Examples 1 to 3

According to the formulation shown in Table 1 to Table 5, components were weighed and put into a flask. For DICYANEX 1400F, 2MZA-PW, RIKACID TH, and RIKACID TMEG-600, a master batch was used. The components weighed and put into the flask were uniformly stirred with a stirrer at room temperature, thereby obtaining an epoxy resin composition. The following measurement and evaluation were performed. The results are shown in Table 1 to Table 5.

(Measurement of Isothermal Viscosity)

Immediately after being prepared, the epoxy resin composition was put and sealed into an airtightable container, and stored by being left to stand in a room at 23° C. in a place protected from direct sunlight. Thirty minutes, 10 days, and 20 days after the preparation of the epoxy resin composition, the viscosity of the composition was measured as below.

The plate of a rheometer (manufactured by TA Instruments, Inc., AR-G2) was preheated to 30° C. and kept as it was until the temperature became stable. After the temperature was found to be stable, the epoxy resin composition was isolated into a plate, the gap was adjusted, and then the measurement was started under the following condition. For 10 minutes, 10 spots were measured, and the average thereof was adopted as viscosity.

Measurement mode: constant stress,
Level of stress: 300 Pa,
Frequency: 1.59 Hz,
Plate diameter: 25 mm,
Plate type: parallel plate,
Plate gap: 0.5 mm.

(Measurement of Viscosity Under Beating Condition)

Immediately after being prepared, the epoxy resin composition was put and sealed into an airtightable container, and stored by being left to stand in a room at 23° C. in a place protected from direct sunlight. Seven days after the preparation of the epoxy resin composition, the viscosity of the composition was measured as below.

The plate of a rheometer (manufactured by Thermo Fisher Scientific, MARS40) was preheated to 30° C. and kept as it was until the temperature became stable. After the temperature was found to be stable, the epoxy resin composition was isolated into a plate, the gap was adjusted, and then the measurement was started under the following condition. For 10 minutes, 10 spots were measured, and the average thereof was adopted as viscosity.

Measurement mode: constant stress,
Level of stress: 300 Pa,
Frequency: 1.59 Hz,
Plate diameter: 25 mm,
Plate type: parallel plate,
Plate gap: 0.5 mm
Temperature: increased at 2° C./min from 30° C. to a temperature at which the curing reaction of the epoxy resin composition was about to start (that is, a temperature at which the viscosity was rapidly increased)

(Evaluation of Viscosity)

The viscosity of the epoxy resin composition measured at 30° C. 30 minutes after the preparation of the composition is a measure of impregnation properties at the time of impregnating reinforcing fiber with the epoxy resin composition. The viscosity after 30 minutes was evaluated based on the following standards.

A: the viscosity after 30 minutes was equal to or lower than 15 Pa·s (impregnation properties were excellent).
B: the viscosity after 30 minutes was higher than 15 Pa·s.

The viscosity of the epoxy resin composition measured at 30° C. 10 days after the preparation of the composition is a measure for determining whether SMC demonstrates appropriate tackiness and draping properties within a short period of time and whether excellent handleability is maintained. The viscosity after 10 days was evaluated based on the following standards.

A: the viscosity after 10 days was 2,000 to 55,000 Pa·s (handleability was excellent).
B: the viscosity after 10 days is less than 2,000 Pa·s or higher than 55,000 Pa·s.

The viscosity of the epoxy resin composition measured at 30° C. 20 days after the preparation of the composition is a measure for determining whether a thickened material in a B stage is obtained which enables SMC to demonstrate appropriate tackiness or draping properties. Furthermore, the viscosity of the epoxy resin composition measured at 30° C. 20 days after the preparation of the composition is a measure for determining whether the B stage is maintained for a long period of time (B stage stability). The viscosity after 20 days was evaluated based on the following standards.

A: the viscosity after 20 days was 2,000 to 50,000 Pa·s (B stage stability was excellent).
B: the viscosity after 20 days was less than 2,000 Pa·s or higher than 100,000 Pa·s.

(Rate of Change in Viscosity (c) and Viscosity (b))

The value of [viscosity (c)]/[viscosity (b)] is a measure of storage stability of SMC.

The value of [viscosity (c)]/[viscosity (b)] was evaluated based on the following standards.

A: the value of [viscosity (c)]/[viscosity (b)] was equal to or smaller than 3 (storage stability was excellent).
B: the value of [viscosity (c)]/[viscosity (b)] was greater than 3.

(Evaluation of Viscosity Under Heating Condition)

The viscometry under heating condition is a measure of fluidity of SMC at the time of press molding. Regarding the result of the viscometry under a beating condition, the higher the viscosity at which the curing reaction of the epoxy resin composition is about to start (that is, the higher the viscosity that will be rapidly increased), the further the occurrence of burrs at the time of press molding can be inhibited. The viscosity under a heating condition was evaluated based on the following standards.

A: the viscosity after 7 days at which the curing reaction of the epoxy resin composition was about to start is 0.5 Pa·s to 500 Pa·s (fluidity of SMC at the time of press molding was excellent).
B: the viscosity after 7 days at which the curing reaction of the epoxy resin composition was about to start was less than 0.5 Pa·s or higher than 500 Pa·s.

(Evaluation of Occurrence of Burrs)

In a case where the number of burrs occurring in a molding die is small, the buns can be removed within a short period of time after molding. Accordingly, the molding cycle can be shortened.

A die having a size of 300 mm (length)×300 mm (width)×2 mm (thickness) was charged with a laminated substance obtained by laminating SMC having a size of 300 mm (length)×300 mm (width) in 2 ply. Under the condition of a die temperature of 140° C. and a pressure of 4 MPa, the laminated substance was heated and compressed for 5 minutes, thereby obtaining a 300 mm×300 mm flat plate-like fiber-reinforced composite material having a thickness of about 2 mm (CFRP molding plate). A bun occurrence rate at the time of manufacturing the CFRP molding plate was calculated by the following equation.

$$(X-Y)/(X) \times 100$$

Herein, X represents the weight of SMC with which the die was charged, and Y represents the weight of the molded article taken out of the die after molding.

The standards for evaluating the occurrence of burrs are as below.

A (excellent): the bur occurrence rate calculated by the above equation was less than 10%.
B (defective): the bur occurrence rate calculated by the above equation was equal to or higher than 10%.

(Quick Curing Properties)

The epoxy resin composition was weighed and put into a standard Hermetic aluminum pan of a differential scanning calorimeter (manufactured by TA Instrument, Inc., Q1000), and a standard aluminum lid of the device was put on the pan, thereby creating a sample. According to the temperature control program of the device, the sample was heated to 140° C. from 30° C. at 200° C./min and then kept under an isothermal condition at 140° C. for 30 minutes. In this way, a DSC heating curve of the epoxy resin composition at a series of control temperatures was obtained. In the DSC heating curve, a tangent was drawn from a point, at which the slope of a curve is maximum along which the beating amount was getting reduced from the peak of the heating amount, and a tangent (baseline) was drawn from a portion where the heating resulting from the curing reaction was stopped. The time on the intersection point between these tangents was adopted as a curing finish time. The curing finish time is a measure of a molding time of a molding material. The quick curing properties were evaluated based on the following standards.

A: the curing finish time was equal to or shorter than 10 minutes (quick curing properties were excellent).
B: the curing finish time was longer than 10 minutes.

(Preparation of Cured Resin Plate)

The epoxy resin composition was defoamed in a vacuum and injected into the space between two sheets of glass plates having a thickness of 4 mm between which a polytetrafluoroethylene spacer having a thickness of 2 mm was interposed. Under the condition by which the surface temperature of the glass plates became 140° C., the epoxy resin composition was heated for 10 minutes in a hot air circulation-type thermostatic furnace and then cooled, thereby obtaining a cured resin plate.

(Bending Characteristics)

Six sheets of test pieces having a width of 8 mm and a length of 60 mm were cut out of the cured resin plate. By using an all-purpose tester (manufactured by Instron, INSTRON 4465), bending strength, flexural modulus, bending elongation at break, and bending elongation at yield were measured under the following condition, and the average of the 6 sheets was determined.

Crosshead speed: 2 mm/min,
Span length: set by actually measuring the thickness of the cured resin plate and multiplying the thickness by 16 (unit: mm)

(Heat Resistance)

The cured resin plate was processed into a 55 mm (length)×12.5 mm (width) test piece and measured at a measurement frequency of 1 Hz and a heating rate of 5° C./min by using a rheometer (TA Instrument, Inc., ARES-RDA). log G' was plotted for temperature, and a temperature on an intersection point between an approximating line of a region where log G' was constant and an approximating line of a region where log G's was rapidly reduced was recorded as a glass transition temperature (G'-Tg (° C.)). The peak top of Log G" was denoted as G"-Tg (° C.). The peak top of tan δ was denoted as tan δ (° C.). The heat resistance was evaluated based on the following standards.

A: the glass transition temperature (G'-Tg) was equal to or higher than 130° C. (heat resistance was excellent).

B: the glass transition temperature (G'-Tg) was less than 130° C.

TABLE 1

|  |  | Example | | | | | |
|---|---|---|---|---|---|---|---|
|  |  | 1 | 2 | 3 | 4 | 5 | 6 |
| Component (A) | jER ®828 | 100 | 100 | 100 | 100 | 100 | 100 |
| Component (B) | HN-2200 | 14 | 14 | 12.5 | 12.5 | 11 | 11 |
| Component (C) | 2MZA-PW | 4 | 6 | 4 | 6 | 4 | 6 |
| Epoxy group equivalent | | 0.54 | 0.54 | 0.54 | 0.54 | 0.54 | 0.54 |
| Acid anhydride group equivalent | | 0.17 | 0.17 | 0.15 | 0.15 | 0.13 | 0.13 |
| Acid anhydride group/epoxy group | | 0.31 | 0.31 | 0.28 | 0.28 | 0.25 | 0.25 |
| Viscosity at 30° C. | After 30 minutes (Pa · s) | 2.6 | 2.7 | 2.8 | 2.9 | 2.9 | 3.2 |
|  | After 10 days (Pa · s) | 436 | 1545 | 534 | 1,518 | 651 | 1,159 |
|  | After 20 days (Pa · s) | 11,260 | 9,463 | 4,571 | 5,384 | 2,198 | 3,093 |
|  | Evaluation of viscosity after 30 munutes | A | A | A | A | A | A |
|  | Evaluation of viscosity after 20 days | A | A | A | A | A | A |
| Quick curing properties | Curing finish time (min) | 6 | 5 | 6 | 6 | 7 | 6 |
|  | Evaluation of quick curing properties | A | A | A | A | A | A |
| Bending characteristics | Bending strength (MPa) | 139.9 | 143.5 | 139.8 | 133.8 | 143.1 | 134.1 |
|  | Flexural modulus (GPa) | 3.44 | 3.46 | 3.45 | 3.45 | 3.4 | 3.4 |
|  | Bending elongation at break (%) | 5.25 | 5.71 | 5.11 | 5.15 | 5.64 | 5.54 |
|  | Bending elongation at yield (%) | 5.24 | 5.7 | 5.1 | 5.15 | 5.63 | 5.53 |
| Heat resistance | G'-Tg (° C.) | 137 | 144 | 137 | 142 | 138 | 148 |
|  | G"-Tg (° C.) | 147 | 154 | 147 | 153 | 148 | 159 |
|  | tan δ (° C.) | 165 | 171 | 166 | 173 | 168 | 177 |
|  | Evaluation of heat resistance | A | A | A | A | A | A |

TABLE 2

|  |  | Example | | | | | |
|---|---|---|---|---|---|---|---|
|  |  | 7 | 8 | 9 | 10 | 11 | 12 |
| Component (A) | jER ®828 | 100 | 80 | 5 | 100 | 100 | 100 |
|  | jER ®807 |  |  | 95 |  |  |  |
|  | jER ®630 |  | 20 |  |  |  |  |
| Component (B) | HN-2200 | 14 | 14 | 14 | 10 | 14 | 14 |
| Component (C) | 2MZA-PW | 5 | 5 | 5 | 5 | 5 | 5 |
| Component (D) | DICYANEX1400F |  |  |  |  | 1 | 0.5 |
| Component (E) | 2E4MZ | 0.03 | 0.03 | 0.03 | 0.05 |  |  |
| Epoxy group equivalent | | 0.54 | 0.64 | 0.6 | 0.54 | 0.54 | 0.54 |
| Acid anhydride group equivalent | | 0.17 | 0.17 | 0.17 | 0.12 | 0.17 | 0.17 |
| Acid anhydride group/epoxy group | | 0.31 | 0.26 | 0.28 | 0.22 | 0.31 | 0.31 |
| Viscosity at 30° C. | After 30 minutes (Pa · s) | 3 | 2 | 1 | 5 | 3 | 3 |
|  | After 10 days (Pa · s) | 6,207 | 4,592 | 1,027 | 2,403 | 8,706 | 7,902 |
|  | After 20 days (Pa · s) | 12,290 | 6,921 | 2,204 | 6,017 | 16,880 | 12,500 |
|  | Evaluation of viscosity after 30 mmutes | A | A | A | A | A | A |

TABLE 2-continued

|  |  | Example | | | | | |
|---|---|---|---|---|---|---|---|
|  |  | 7 | 8 | 9 | 10 | 11 | 12 |
|  | Evaluation of viscosity after 20 days | A | A | A | A | A | A |
| Quick curing properties | Curing finish time (min) | 6 | 5 | 5 | 5 | 6 | 6 |
|  | Evaluation of quick curing properties | A | A | A | A | A | A |
| Bending characteristics | Bending strength (MPa) | 145.8 | 144.6 | 155.1 | 134.7 | 147.2 | 139.7 |
|  | Flexural modulus (GPa) | 3.34 | 3.53 | 3.56 | 3.49 | 3.31 | 3.32 |
|  | Bending elongation at break | 6.27 | 5.68 | 6.62 | 5.1 | 8.86 | 6.56 |
|  | Bending elongation at yield (%) | 6.26 | 5.67 | 6,6 | 5.09 | 7.64 | 6.38 |
| Heat resistance | G'-Tg (° C.) | 144 | 149 | 136 | 143 | 152 | 152 |
|  | G'-Tg (° C.) | 154 | 161 | 143 | 155 | 160 | 160 |
|  | tan δ (° C.) | 170 | 182 | 155 | 174 | 173 | 174 |
|  | Evaluation of heat resistance | A | A | A | A | A | A |

TABLE 3

|  |  | Example | | | | |
|---|---|---|---|---|---|---|
|  |  | 13 | 14 | 15 | 16 | 17 |
| Component (A) | jER ®828 | 100 | 100 | 100 | 100 | 100 |
| Component (B) | HN-2200 |  |  | 14 |  |  |
|  | HN-2000 | 14 |  |  | 14 |  |
|  | HN-5500 |  | 14.2 |  |  | 14.2 |
| Component (C) | 2MZA-PW | 6 | 6 | 5 | 5 | 5 |
| Component (E) | 2E4MZ |  |  | 0.07 | 0.07 | 0.07 |
| Epoxy group equivalent |  | 0.54 | 0.54 | 0.54 | 0.54 | 0.54 |
| Acid anhydride group equivalent |  | 0.17 | 0.17 | 0.17 | 0.17 | 0.17 |
| Acid anhydride group/epoxy group |  | 0.31 | 0.31 | 0.31 | 0.31 | 0.31 |
| Viscosity at 30° C. | After 30 minutes (Pa · s) | 3 | 4 | 4 | 3 | 4 |
|  | After 10 days (Pa · s) | 1,853 | 1,680 | 7,793 | 10,200 | 4,386 |
|  | After 20 days (Pa · s) | 15,860 | 33,210 | 16,040 | 41,780 | 32,870 |
|  | Evaluation of viscosity after 30 minutes | A | A | A | A | A |
|  | Evaluation of viscosity after 20 days | A | A | A | A | A |
| Quick curing properties | Curing finish time (min) | 6 | 6 | 5 | 5 | 5 |
|  | Evaluation of quick curing properties | A | A | A | A | A |
| Bending characteristics | Bending strength (MPa) | 138.7 | 135 | 137.5 | 141.3 | 144.6 |
|  | Flexural modulus (GPa) | 3.4 | 3.44 | 3.47 | 3.54 | 3.56 |
|  | Bending elongation at break (%) | 5.39 | 4.93 | 5.53 | 5.56 | 5.67 |
|  | Bending elongation at yield (%) | 5.38 | 4.92 | 5.53 | 5.55 | 5.66 |
| Heat resistance | G'-Tg (° C.) | 141 | 139 | 140 | 134 | 134 |
|  | G'-Tg (° C.) | 151 | 149 | 149 | 144 | 144 |
|  | tan δ (° C.) | 168 | 168 | 167 | 163 | 162 |
|  | Evaluation of heat resistance | A | A | A | A | A |

TABLE 4

| | | Example | | | | | |
|---|---|---|---|---|---|---|---|
| | | 18 | 19 | 20 | 21 | 22 | 23 |
| Component (A) | jER ®828 | 95 | 95 | 95 | 95 | 95 | 95 |
| | TETRAD-X | 5 | 5 | 5 | 5 | 5 | 5 |
| Component (B) | HN-2200 | 12.5 | 12.5 | 12.5 | 13.8 | 13.8 | 13.8 |
| Component (C) | 2MZA-PW | 6 | 6 | 4 | 5 | 5 | 5 |
| Other components | Omicure ®24 | | | | | | 2 |
| Component (D) | DICYANEX1400F | | 2 | | 2 | 4 | 2 |
| Epoxy group equivalent | | 0.56 | 0.56 | 0.56 | 0,56 | 0.56 | 0.56 |
| Acid anhydride group equivalent | | 0.15 | 0.15 | 0.15 | 0.17 | 0.17 | 0.17 |
| Acid anhydride group/epoxy group | | 0.27 | 0.27 | 0.27 | 0.3 | 0.3 | 0.3 |
| Viscosity at 30° C. | After 30 minutes (Pa · s) | 4 | 4 | 1 | 3 | 4 | 4 |
| | After 10 days (Pa · s) | 3,725 | 3,454 | 2,919 | 8,683 | 7,172 | 11,170 |
| | After 20 days (Pa · s) | 3,802 | 5,666 | 3,415 | 10,380 | 13,830 | 16,250 |
| | Evaluation of viscosity after 30 minutes | A | A | A | A | A | A |
| | Evaluation of viscosity after 20 days | A | A | A | A | A | A |
| Quick curing properties | Curing finish time (min) | 5 | 6 | 5 | 7 | 9 | 7 |
| | Evaluation of quick curing properties | A | A | A | A | A | A |
| Bending characteristics | Bending strength (MPa) | 130.1 | 150.1 | 135.7 | 148.3 | 162 | 124.5 |
| | Flexural modulus (GPa) | 3.38 | 3.29 | 3.41 | 3.33 | 3.49 | 3.37 |
| | Bending elongation at break (%) | 5.13 | 9.46 | 5.32 | 9.7 | 10.69 | 4.41 |
| | Bending elongation at yield (%) | 5.12 | 7.56 | 5.32 | 7.69 | 7.6 | 4.41 |
| Heat resistance | G'-Tg (° C.) | 144 | 154 | 137 | 154 | 148 | 149 |
| | G'-Tg (° C.) | 158 | 162 | 150 | 162 | 155 | 155 |
| | tan δ (° C.) | 175 | 172 | 167 | 171 | 163 | 163 |
| | Evaluation of heat resistance | A | A | A | A | A | A |

TABLE 5

| | | Comparative Example | | |
|---|---|---|---|---|
| | | 1 | 2 | 3 |
| Component (A) | jER ® 828 | | | |
| | jER ® 807 | 70 | 70 | 70 |
| | jER ® 604 | 30 | 30 | 30 |
| Component (B) | HN-2200 | | | |
| | MHAC-P | 10 | 15 | 20 |
| Component (C) | 2MZA-PW | | | |
| Component (D) | 2E4MZ | | | |
| Other components | DY9577 | 5 | 2 | 5 |
| Epoxy group equivalent | | 0.42 | 0.42 | 0.42 |
| Acid anhydride group equivalent | | 0.1 | 0.15 | 0.2 |
| Acid anhydride group/epoxy group | | 0.23 | 0.35 | 0.47 |
| Viscosity at 30° C. | After 30 minutes (Pa · s) | 3 | 2 | 1 |
| | After 10 days (Pa · s) | 22 | 49 | 58 |
| | After 20 days (Pa · s) | 101 | 946 | 2,568 |
| | Evaluation of viscosity after 30 minutes | A | A | A |
| | Evaluation of viscosity after 20 days | B | B | A |
| Quick curing properties | Curing finish time (min) | 14 | 11 | 12 |
| | Evaluation of quick curing properties | B | B | B |

The epoxy resin compositions of Examples 1 to 23 have a low viscosity 30 minutes after the preparation of the compositions and exhibit excellent impregnation properties at the time of manufacturing SMC. Furthermore, 10 days after the preparation of these epoxy resin compositions, these compositions have appropriately shifted to the B stage. In a case where these compositions are made into SMC, the tackiness and draping properties thereof are appropriate. In addition, the B stage stability thereof is also excellent. These compositions also have excellent quick curing properties, and in a case where the compositions are made into SMC, they can be molded within a short period of time. The cured material of SMC obtained from the epoxy resin compositions of Examples 1 to 23 less causes burrs, and the bending strength, flexural modulus, and heat resistance thereof are also high.

Comparative Examples 1 and 2 are examples in which epoxy resin compositions are prepared with reference to PTL 6 to 8. The epoxy resin compositions of Comparative Examples 1 and 2 have a low viscosity 30 minutes after the preparation of the compositions and exhibit excellent impregnation properties. However, these compositions have a low viscosity 20 days after the preparation of the compositions and have extremely strong tackiness. In a case where these compositions are used as a molding material, due to the strong tackiness, the handleability thereof is poor. Furthermore, because the quick curing properties thereof are poor, it takes a long time to cure the compositions. In a case where these compositions are used as a molding material, the time for which the material stays in a die is lengthened.

Comparative Example 3 is an example in which an epoxy resin composition is prepared with reference to PTL 6 to 8. The epoxy resin compositions of Comparative Example 3 has a low viscosity 30 minutes after the preparation of the composition and exhibits excellent impregnation properties. Furthermore, 20 days after the preparation of the composition, the composition has appropriately shifted to the B stage. In a case where the composition is used as a molding material, the tackiness and draping properties thereof are appropriate. However, because the quick curing properties thereof are poor, it takes a long time to cure the composition. In a case where the composition is used as a molding material, the time for which the material stays in a die is lengthened.

<Manufacturing of Fiber-Reinforced Composite Material>

Examples 24 to 26

By using a doctor blade, a carrier film made of polyethylene was coated with the epoxy resin composition formulated as shown in Table 6 at 600 g/m$^2$. On the epoxy resin composition, chopped carbon fiber tows, which were obtained by cutting a carbon fiber tow constituted with 15,000 filaments (manufactured by Mitsubishi Rayon Co., Ltd., TR50S 15L) in a length of 25 mum, were scattered such that the basis weight of the carbon fiber substantially became uniform at 1,200 g/m$^2$ and the fiber direction of the carbon fiber became random.

By using a doctor blade, a carrier film made of polyethylene was coated with the same epoxy resin composition at 600 g/m$^2$.

The chopped carbon fiber tows were sandwiched between two sheets of the carrier films such that the side of the epoxy resin composition became inside. The carrier films were pressed by being passed between rolls such that the chopped carbon fiber tows were impregnated with the epoxy resin composition, thereby obtaining a SMC precursor.

The SMC precursor was left to stand at room temperature (23° C.) for 20 days such that the epoxy resin composition in the SMC precursor was sufficiently thickened, thereby obtaining SMC.

SMC was laminated in 2ply, a molding die was charged with the laminated SMC at a charge ratio of 65% (ratio of the area of SMC to the area of the die), and SMC was heated and compressed for 5 minutes under the condition of a die temperature of 140° C. and a pressure of 4 MPa such that the epoxy resin composition was cured, thereby obtaining a 200 mm×300 mm flat plate-like fiber-reinforced composite material having a thickness of about 2 mm (CFRP molding plate). The following measurement and evaluation were performed. The results are shown in Table 6.

(Impregnation Properties)

The SMC precursor was cut in a length of about 30 cm, and the impregnation condition was visually checked and evaluated based on the following standards.

A: dry carbon fiber and the like were not on the cut surface, and the impregnation properties were excellent.

B: dry carbon fiber was checked on the cut surface, and the impregnation properties were not excellent.

(Tackiness)

The tackiness of SMC was evaluated based on the following standards.

A: SMC felt appropriately tacky to the touch, and SMC could be laminated in a simple manner.

B: SMC felt very tacky to the touch, or it was difficult to laminate SMC because the tackiness thereof was weak.

(Draping Properties)

The draping properties of SMC were evaluated based on the following standards.

A: SMC was appropriately flexible to the touch, and it was easy to cut and carry SMC.

B: SMC was poorly flexible to the touch, and it was difficult to cut and carry SMC.

(Handleability)

The handleability of SMC was evaluated based on the following standards.

A: both the tackiness and draping properties were evaluated as A.

B: either or both of the tackiness and draping properties were evaluated as B.

(Heat Resistance)

The CFRP molding plate was processed into a 55 mm (length)×12.5 mm (width) test piece and measured at a measurement frequency of 1 Hz and a heating rate of 5° C./min by using a rheometer (TA Instrument, Inc., ARES-RDA). log G' was plotted for temperature, and a temperature on an intersection point between an approximating line of a region where log G' was constant and an approximating line of a region where log G's was rapidly reduced was recorded as a glass transition temperature (G'-Tg (° C.)). The peak top of Log G" was denoted as G"-Tg (° C.). The peak top of tan δ was denoted as tan δ (° C.). The heat resistance was evaluated based on the following standards.

A: the glass transition temperature (G'-Tg) was equal to or higher than 130° C. (heat resistance was excellent).

B: the glass transition temperature (G'-Tg) was less than 130° C.

TABLE 6

|  |  | Example | | |
| --- | --- | --- | --- | --- |
|  |  | 24 | 25 | 26 |
| Component (A) | jER ® 828 | 100 | 90 | 90 |
|  | TETRAD-X |  | 10 | 10 |
| Component (B) | HN-2200 | 11 | 12.4 | 12.4 |
| Component (C) | 2MZA-PW | 6 | 6 | 6 |
| Component (D) | DICYANEX1400F | 6 |  | 1 |
| Epoxy group equivalent | | 0.54 | 0.58 | 0.58 |
| Acid anhydride group equivalent | | 0.13 | 0.15 | 0.15 |
| Acid anhydride group/epoxy group | | 0.25 | 0.26 | 0.26 |
| Impregnation properties | | A | A | A |
| Tackiness | | A | A | A |
| Draping properties | | A | A | A |
| Handleability | | A | A | A |
| Heat resistance | G'-Tg(° C.) | 140 | 163 | 153 |
|  | G"-Tg (° C.) | 150 | 130 | 167 |
|  | tan δ (° C.) | 166 | 170 | 173 |
|  | Evaluation of heat resistance | A | A | A |

By using the epoxy resin compositions of Examples 24 to 26, SMC was prepared, and fiber-reinforced composite materials were manufactured. The impregnation properties, tackiness, and draping properties thereof were excellent, and the handleability thereof was extremely excellent. Furthermore, the heat resistance thereof was high, and at the time of taking the fiber-reinforced composite material out of a die, the material maintained sufficient stiffness and exhibited excellent mold release properties as well.

<Preparation of Epoxy Resin Composition>

Examples 27 to 30

According to the formulation shown in Table 7, epoxy resin compositions were obtained in the same manner as in Examples 1 to 23. The epoxy resin compositions were measured and evaluated in the same manner as in Examples 1 to 23. The results are shown in Table 7.

TABLE 7

| | | Example 27 | Example 28 | Example 29 | Example 30 |
|---|---|---|---|---|---|
| Component (A) | jER ® 828 | 95 | 95 | 95 | 95 |
| | TETRAD-X | 5 | 5 | 5 | 5 |
| Component (B) | HN-2200 | | 12 | 10 | 5 |
| | MH-700 | | | | |
| | TMEG-600 | | 2 | 4.5 | |
| | MTA-15 | 12 | | | 8 |
| Component (C) | 2MZA-PW | 5 | 5 | 5 | 5 |
| Component (D) | DICY1400F | 1 | 1 | 1 | 1 |
| | Epoxy group equivalent [g/eq.] | 0.56 | 0.56 | 0.56 | 0.56 |
| | Acid anhydride group equivalent [g/eq.] | 0.07 | 0.15 | 0.14 | 0.11 |
| | Acid anhydride group/epoxy group | 0.13 | 0.28 | 0.25 | 0.19 |
| Viscosity at 30° C. | Viscometry (a) after 30 minutes (Pa · s) | 11 | 4 | 6 | 6 |
| | Viscometry (b) after 10 days (Pa · s) | 15,790 | 11,030 | 8,559 | 11,140 |
| | Viscometry (c) after 20 days (Pa · s) | 11,060 | 12,040 | 10,740 | 11,410 |
| | (c)/(b) | 0.7 | 1.1 | 1.3 | 1.0 |
| | Evaluation of viscosity after 30 minutes | A | A | A | A |
| | Evaluation of viscosity after 20 days | A | A | A | A |
| | Evaluation of viscosity after 20 days | A | A | A | A |
| Viscosity under heating condition | Minimum viscosity [Pa · s] | 1.1 | 0.7 | 1.1 | 1.1 |
| | Temperature at minimum viscosity [° C.] | 123 | 117 | 120 | 117 |
| | Fluidity | A | A | A | A |
| Occurrence of burr | Burr occurrence rate [%] | 4 | 8 | 6 | 6 |
| | Evaluation of occurrence of burr | A | A | A | A |
| Quick curing properties | Curing finish time (min) | 7.0 | 6.5 | 6.8 | 6.6 |
| | Evaluation of quick curing properties | A | A | A | A |
| Bending characteristics | Bending strength (MPa) | 151 | 142 | 132 | 158 |
| | Flexural modulus (GPa) | 3.40 | 3.41 | 3.47 | 3.46 |
| | Bending elongation at break (%) | 6.84 | 5.47 | 4.53 | 8.33 |
| | Bending elongation at yield (%) | 6.77 | 5.47 | 4.53 | 7.69 |
| Heat resistance | G'-Tg(° C.) | 156 | 157 | 156 | 158 |
| | G"-Tg (° C.) | 168 | 166 | 165 | 166 |
| | tan δ (° C.) | 185 | 180 | 181 | 181 |
| | Evaluation of heat resistance | A | A | A | A |

The epoxy compositions of Examples 27 to 30 have a low viscosity 30 minutes after the preparation of the compositions, and at the time of manufacturing SMC, the compositions exhibit excellent impregnation properties. Furthermore, 10 days after the preparation of these epoxy resin compositions, these compositions have appropriately shifted to the B stage. In a case where these compositions are made into SMC, the tackiness and draping properties thereof are appropriate. In addition, the B stage stability thereof is also excellent. These compositions also have excellent quick curing properties, and in a case where the compositions are made into SMC, they can be molded within a short period of time. The cured material of SMC obtained from the epoxy resin compositions of Examples 27 to 30 less causes burrs, and the bending strength, flexural modulus, and heat resistance thereof are also high.

INDUSTRIAL APPLICABILITY

The sheet molding compound of the present invention is excellent in the reinforcing fiber impregnation properties, the tackiness and draping properties after the shift to the B stage, the B stage stability (fluidity at the time of press molding), the quick curing properties at the time of heating (staying in a die for a short period of time at the time of press molding), and forms a cured material having excellent heat resistance. Furthermore, owing to its excellent mechanical characteristics and heat resistance after curing, the sheet molding compound of the present invention is suitable as a raw material of structural parts for industries and automobiles.

The invention claimed is:

1. A process for manufacturing a sheet molding compound, comprising:
   impregnating a sheet-like substance formed of chopped reinforcing fiber tows with an epoxy resin composition; and
   thickening the epoxy resin composition so that the epoxy resin composition shifts to a B-stage,
   wherein the epoxy resin composition comprises
   a component (A),
   a component (B) and
   a component (C),
   wherein
   the component (A) is an epoxy resin staying in a liquid state at 25° C. and comprises a glycidyl amine-based epoxy resin,
   the component (B) is an acid anhydride,
   the component (C) is an epoxy resin curing agent comprising an imidazole-based compound having a melting point of 120° C. to 300° C.,
   wherein the epoxy resin composition is free of a urea compound,
   wherein a glass transition temperature of a cured material obtainable by curing the epoxy resin composition at 140° C. for 10 minutes is 140° C. to 163° C., and
   wherein a content of the component (C) with respect to 100 parts by mass of the entire epoxy resin contained in the epoxy resin composition is 2 to 10 parts by mass.

2. The process according to claim 1, wherein the impregnation comprises:
   preparing two films uniformly coated with the epoxy resin composition;
   scattering the chopped reinforcing fiber tows randomly on a surface of one of the films coated with the epoxy resin composition, thereby obtaining the sheet-like substance;
   bonding a surface of the other film coated with the epoxy resin composition to a surface of the sheet-like substance; and
   pressing the sheet-like substance so as to be impregnated with the epoxy resin composition.

3. The process according to claim 2, wherein the thickening comprises holding the impregnated sheet-like substance for several days to tens of days at a temperature of about room temperature to 60° C.

4. The process according to claim 3, wherein a viscosity of the epoxy resin composition that is measured by viscometry (a) at 30° C. 30 minutes after the preparation of the composition described below is 0.5 to 15 Pa·s,
   viscometry (a): immediately after being prepared, the epoxy resin composition is put and sealed into an airtightable container and left to stand for 30 minutes at 23° C., and then a viscosity of the epoxy resin composition at 30° C. is measured.

5. The process according to claim 4, wherein a content of the glycidyl amine-based epoxy resin is 1 to 30 percent of the component (A) by mass.

6. The process according to claim 5, wherein the component (B) stays at a liquid state at 25° C.

7. The process according to claim 6, wherein the component (B) comprises a phthalic anhydride or a hydrogenated phthalic anhydride that may have a substituent.

8. The process according to claim 7, wherein the epoxy resin composition further comprises dicyandiamide.

9. The process according to claim 7, wherein the component (C) further comprises an imidazole-based compound staying in a liquid state at 25° C.

10. The process according to claim 1, wherein the impregnation comprises:
    preparing two films uniformly coated with the epoxy resin composition;
    scattering the chopped reinforcing fiber tows randomly on a surface of one of the films coated with the epoxy resin composition, thereby obtaining the sheet-like substance;
    bonding a surface of the other film coated with the epoxy resin composition to a surface of the sheet-like substance; and
    pressing the sheet-like substance so as to be impregnated with the epoxy resin composition.

11. The process according to claim 1, wherein the thickening comprises holding the impregnated sheet-like substance for several days to tens of days at a temperature of about room temperature to 60° C.

12. The process according to claim 1, wherein a viscosity of the epoxy resin composition that is measured by viscometry (a) at 30° C. 30 minutes after the preparation of the composition described below is 0.5 to 15 Pa·s,
    viscometry (a): immediately after being prepared, the epoxy resin composition is put and sealed into an airtightable container and left to stand for 30 minutes at 23° C., and then a viscosity of the epoxy resin composition at 30° C. is measured.

13. The process according to claim 1, wherein a content of the glycidyl amine-based epoxy resin is 1 to 30 percent of the component (A) by mass.

14. The process according to claim 1, wherein the component (B) stays at a liquid state at 25° C.

15. The process according to claim 1, wherein the component (B) comprises a phthalic anhydride or a hydrogenated phthalic anhydride that may have a substituent.

16. The process according to claim 1, wherein the epoxy resin composition further comprises dicyandiamide.

17. The process according to claim 1, wherein the component (C) further comprises an imidazole-based compound staying in a liquid state at 25° C.

18. The process according to claim 1, wherein the content of the component (C) with respect to 100 parts by mass of the entire epoxy resin contained in the epoxy resin composition is 3 to 7 parts by mass.

* * * * *